(12) United States Patent
Handler

(10) Patent No.: US 9,906,006 B2
(45) Date of Patent: Feb. 27, 2018

(54) ARTICULATING ON-FLOOR ELECTRIC POWER STRIP INCLUDING A CORD PROTECTOR AND CORD OUTLETS

(71) Applicant: Jordan Handler, Rye Brook, NY (US)

(72) Inventor: Jordan Handler, Rye Brook, NY (US)

(73) Assignee: MONOSYSTEMS, INC., Rye Brook, NY (US)

( * ) Notice: Subject to any disclaimer, the term of this patent is extended or adjusted under 35 U.S.C. 154(b) by 0 days.

(21) Appl. No.: 15/407,958

(22) Filed: Jan. 17, 2017

(65) Prior Publication Data
US 2017/0207612 A1  Jul. 20, 2017

Related U.S. Application Data

(60) Provisional application No. 62/279,979, filed on Jan. 18, 2016.

(51) Int. Cl.
| F16L 55/00 | (2006.01) |
| H02G 3/04 | (2006.01) |
| H02G 9/02 | (2006.01) |
| F16L 3/015 | (2006.01) |
| F16L 3/26 | (2006.01) |
| F16L 3/10 | (2006.01) |

(52) U.S. Cl.
CPC .......... H02G 3/0475 (2013.01); H02G 9/025 (2013.01); *F16L 3/015* (2013.01); *F16L 3/1075* (2013.01); *F16L 3/26* (2013.01)

(58) Field of Classification Search
CPC .................................................. H02G 3/0475
USPC ..... 138/108, 109, 120, 155; 174/72 C, 99 R; 59/78.1
See application file for complete search history.

(56) References Cited

U.S. PATENT DOCUMENTS

| 8,168,888 B2* | 5/2012 | Potter | H02G 3/34 |
| | | | 174/99 R |
| 8,921,697 B2* | 12/2014 | Potter | H02G 3/34 |
| | | | 174/99 R |
| 2007/0144778 A1* | 6/2007 | Henry | H02G 3/383 |
| | | | 174/506 |

* cited by examiner

Primary Examiner — Patrick F Brinson
(74) Attorney, Agent, or Firm — Ostrolenk Faber LLP

(57) ABSTRACT

A power strip for covering cables, cords and wires includes a row of segment covers together containing channels with channels for the cables. The opposite ends of adjacent covers are hingedly connected. A coupling is swivelably connected between each set of adjacent ends of the covers. Coupling channels in each coupling complete the cover channels. A diversion tunnel from a coupling channel and out the lateral side of the power strip for diversion of cables out of the power strip.

5 Claims, 5 Drawing Sheets

FIG. 10
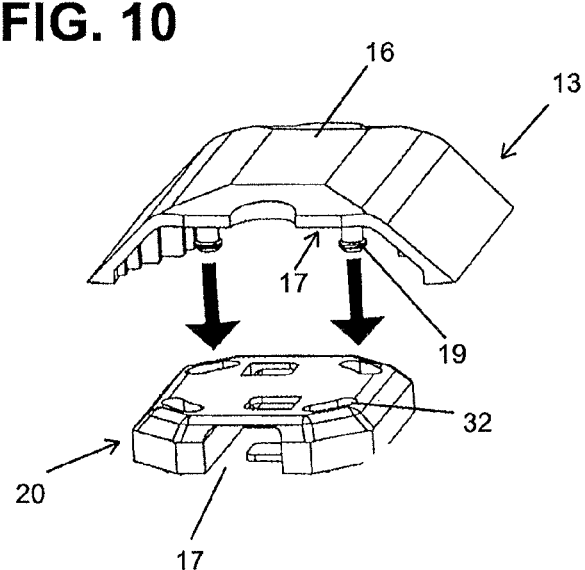
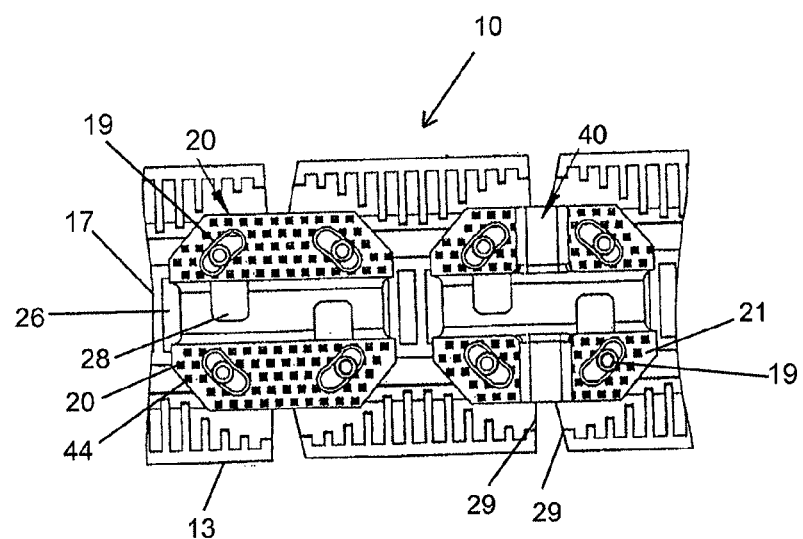
FIG. 11

ARTICULATING ON-FLOOR ELECTRIC POWER STRIP INCLUDING A CORD PROTECTOR AND CORD OUTLETS

The present application claims benefit of and priority to U.S. Provisional Application No. 62/279,979, filed Jan. 18, 2016 entitled ARTICUATING ON-FLOOR ELECTRIC POWER STRIP INCLUDING A CORD PROTECTOR AND CORD OUTLETS, the entire contents of which are hereby incorporated by reference herein.

FIELD OF THE INVENTION

The invention concerns an articulating electric cord wire and cable covering/protection system for use for an electric power strip. One preferred form is a power strip for low voltage and/or computer cables/cords. But, it may be configured for power cables. Further, the power strip is typically not a powered or electrified product.

BACKGROUND OF THE INVENTION

In domestic and industrial applications, electric cables or wires, both low voltage or power cables, may frequently pass over a floor or other surface where a person's foot, a service vehicle, etc. may run or where the cords or cables may be tripped over, etc. To prevent such occurrences, some appropriate cover, saddle or housing may be placed over the cables and may be anchored to the surface over which the cables run, so that danger from or damage to the cables or the objects passing over them are unlikely to occur.

Electric power and data are often supplied to an electric power bar, or the like object, which contains or covers a plurality of electric power or data cables which are, in turn, connected to a plurality of electric outlets along the power bar. Each outlet or several of them may be served by a single power cable or electric power circuit in the power bar. Power bars have typically been unarticulated unitary and rigid bars having individual outlets on one or more surfaces of the bar.

To accommodate various arrangements and configurations of power or data cables, and configurations of sites in which a power bar is typically located and for positioning the power outlets at the power bar for access by the user of the multi-outlet power bar, articulated power bars or articulated covers over one or a plurality of powered electric cables or wires may be used. Each power bar or cover includes a plurality of outlets supported on segments or pads. Neighboring segments or pads are connected at articulated joints, so that the power bar may be positioned to provide a better or more convenient access location for each of the outlets along the articulated power bar. The power bars do not have below described features of the power strip disclosed herein.

SUMMARY OF THE INVENTION

The present invention concerns supporting and protecting low voltage and/or data and/or computer cables or cords, but may be used for higher voltage power cables. Hereafter, the description "cables" may refer to cables, wires or cords of lower or higher voltage or computer cables or cables or wires to be electrically connected to any device. A power strip disclosed herein may be in an articulated power strip configuration.

A power strip providing a passage for a plurality of cables comprises separate, individual segments of power strip elements. Each segment includes a cover over the cables. The cover defines a longitudinal cover channel above its underside for passage of cables through the segment and then to the next segment in sequence along the power strip. Adjacent segment covers are articulatedly connected at their opposite ends to the ends of adjacent segment covers to define a power strip with an effective continuous multi-segment cover over the cables. The covers define a continuous cover channel for cables extending along the power strip. The connections between adjacent covers are articulated, so that the power strip may be bent at the articulations or hinges there to change the direction of the next segment cover and of the channel through the next cover, to satisfy a user's requirements for a particular articulated power strip.

A first articulated connection comprises a tongue at an end of a cover, and the tongue is received in a notch at an end of an adjacent cover. The tongue in a notch defines a pivot connection between each two adjacent covers.

A second articulated connection comprises a separate coupling attached between adjacent end regions of adjacent covers to guide the pivoting at the first articulated connection. At least one projection, preferably from the cover, extends into a slot near a respective longitudinal end of the coupling, and this helps guide pivoting of the first articulated connection. The projection from the cover and the slot in the coupling are off the line of the respective first articulated connections of a segment cover, whereby each projection moves along its slot as the segments articulate or bend at their first articulated connection. Preferably, there are two of the second articulated connections at each end of the coupling, one at each lateral side of the first articulated connection.

A coupling channel at the underside of each coupling is continuous with the cover channels in the adjacent segment covers, so that the cables may extend through the channels of the segment covers and the couplings. The couplings attached between adjacent power strip segment covers connect the adjacent covers and guide their articulation and additionally prevent the segment covers from moving out of their plane and off the floor or surface during articulated pivoting.

Typically, several cables pass through the continuous cover and coupling channel defined in the segments and the coupling together defining a pathway channel. Apparatus are supplied with electricity or are electrically connected by one or, more typically, several cables passing through the power strip channels.

One preferred way for providing electric current to each such apparatus is by diverting selected cables out of the pathway channel, and particularly the coupling channel and out of a lateral side of the power strip for connection to an apparatus requiring electrical input from the diverted cables. So that diverted cables are not prevented from or not interfered with extending from a coupling channel and out a lateral side of the power strip, a side channel or tunnel communicates between the pathway channel, and particularly one of the coupling channels, through the power strip and out through one or both sides of the power strip. The tunnel is configured for redirecting the cables from the coupling channel and for supporting them on their path out of the power strip. Alternatively, the cable may be diverted out of a cover channel, not only out of a coupling channel. In a preferred embodiment, one, several or all of the couplings includes a side channel out of the coupling channel through which cables may be diverted.

The segment covers of the power strip are shaped to provide an open area between opposing ends of at least two adjacent covers for power cables to exit the channel and pass through and out of the tunnel without interference and to avoid contact between the cables and the articulating covers, to preserve the power strip and the cables.

In use, the power strip rests on a surface with its channels and its cable diversion tunnels toward the bottom of the power strip. The power strip and particularly its couplings, for example, may have elements which so engage or possibly so attach to the surface below the power strip that movement of the power strip over that surface is prevented or inhibited.

Other features and advantages of the present invention will become apparent from the following description of the invention which refers to the accompanying drawings.

BRIEF DESCRIPTION OF THE DRAWINGS

FIG. 10 is a perspective view showing the cover to be fitted on the coupling; and FIG. 11 is a bottom view of a fragment of a power strip showing both types of couplings.

DETAILED DESCRIPTION OF AN EMBODIMENT OF THE INVENTION

Figure 1:
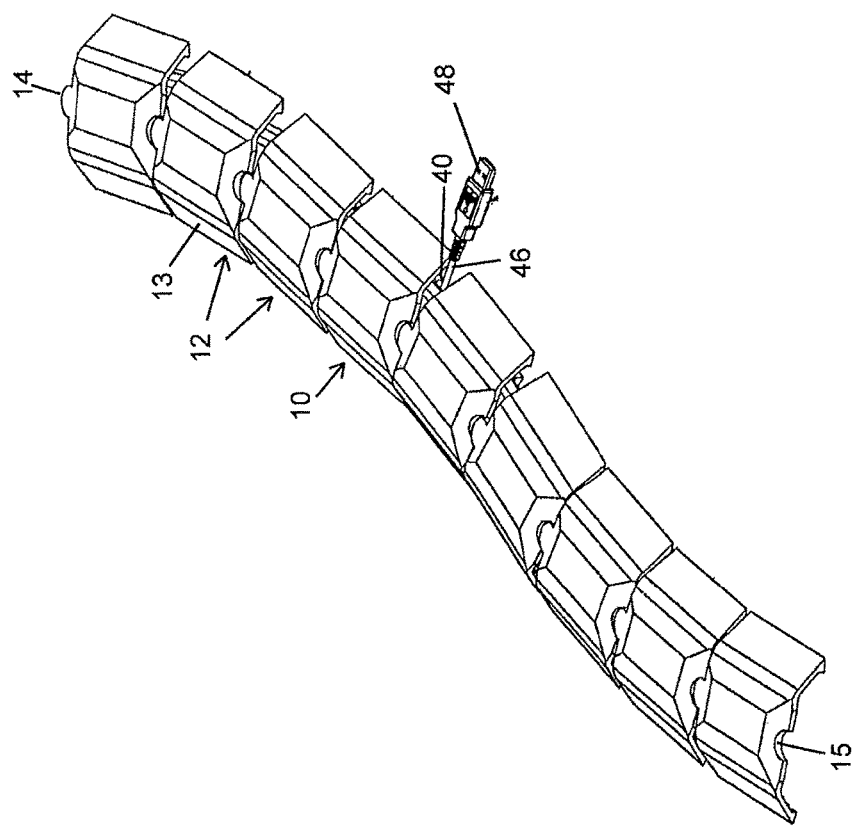
FIG. 1 is a top, side and perspective view of a fragment of a power strip of the invention comprised of segments each including a cover and the covers are joined by respective articulations or hinge elements and by couplings between adjacent covers.
Figure 2:
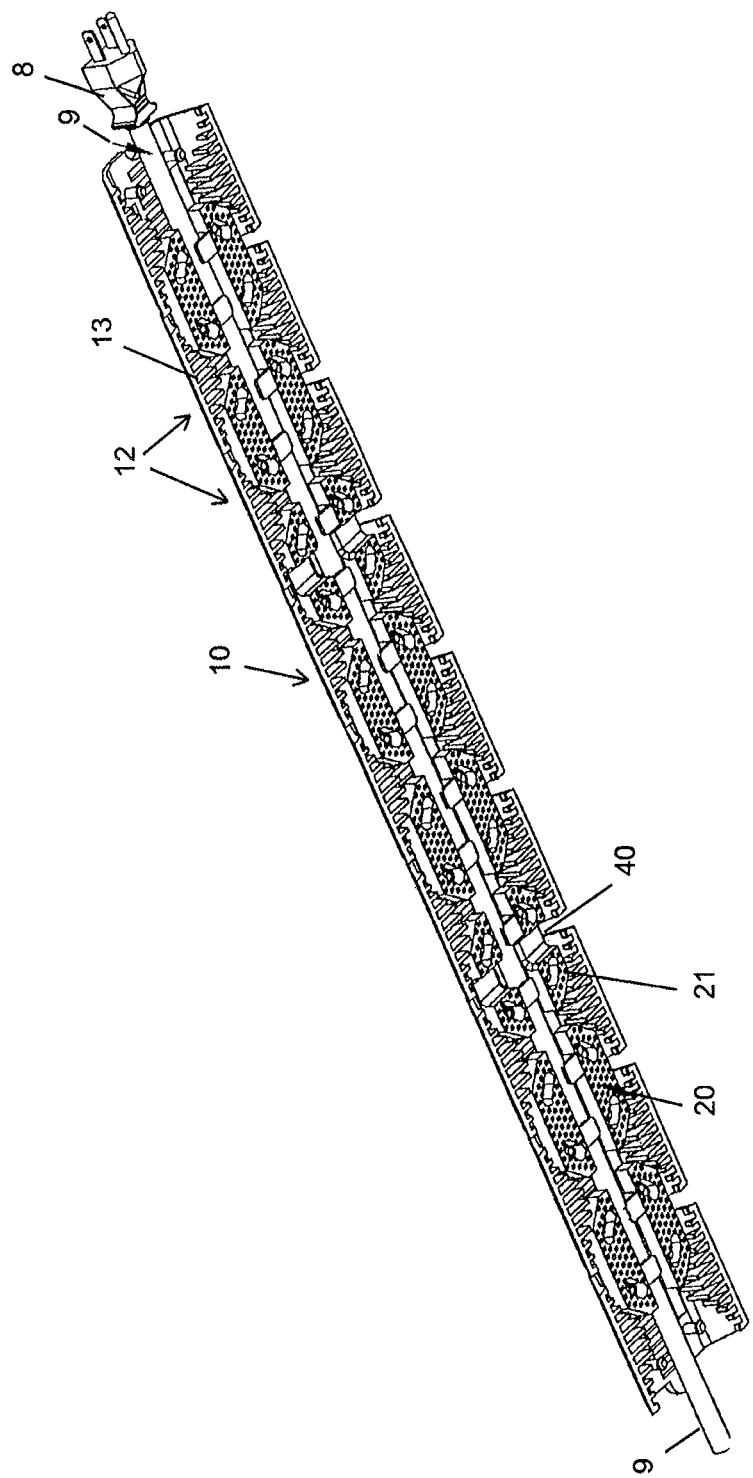
FIG. 2 is a bottom, perspective view of the fragment of the power strip showing the bottom views of covers and the couplings and also of special couplings with side tunnels.

FIGS. 1, 2 and 11 illustrate a fragment of a power strip 10 comprised of a series of individual power strip segments 12.

Figure 3:
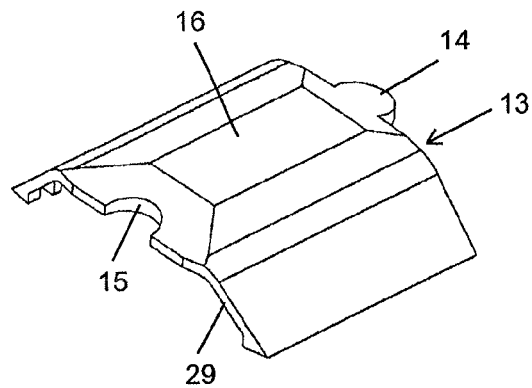
FIG. 3 is a top, side and perspective view of a cover.
Figure 4:
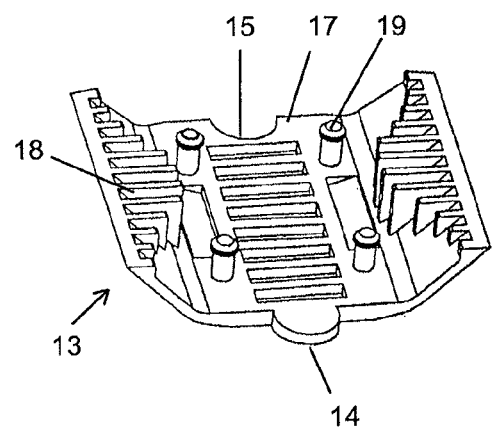
FIG. 4 is a bottom perspective view of a cover.

The power strip is comprised of segments 12 defined by covers 13 over one or more cables 9 passing from an electric connector 8 through and along the length of the power strip. Each cover 13 defines the external shape of the segment. Referring to FIGS. 3 and 4, the segments are hingedly, articulatedly connected to one another end to end by each cover having a rounded protrusion 14 at one end of each cover coupled into a rounded notch 15 at the other end of an adjacent cover. These together hingedly connect adjacent covers and guide them to pivot around a common axis of the protrusion and the notch.

As shown in the underside views of FIGS. 2, 4 and 11, the cover 13 defines a channel 17 through which one or a plurality of cables 9, may be passed. Rigidifying ribs 18 under the cover 13 strengthen the cover against normal stresses of use, such as a person's foot, furniture, a wheeled vehicle etc., pressing on the cover. The ribs 18 have a transverse length to provide space for the below described coupling 20 and permit the coupling to swivel, as described below.

Figure 5:
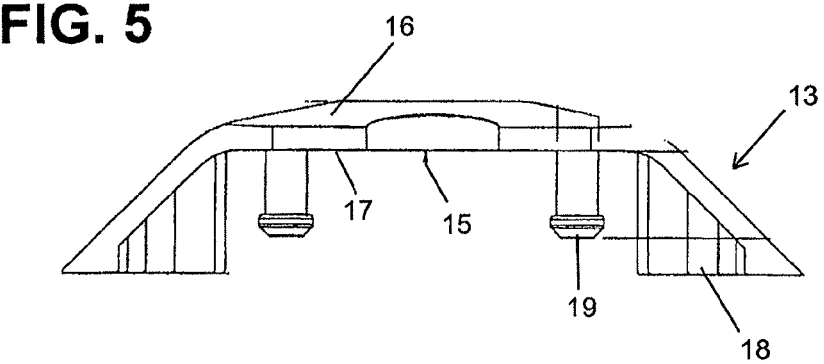
FIG. 5 is an end view of a cover.
Figure 6:
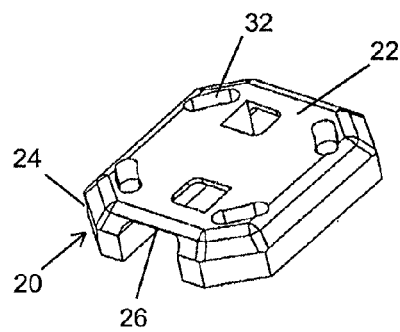
FIG. 6 is a top, side and perspective view of a coupling used with the power strip.

FIGS. 4, 5 and 10 show that the cover 13 also has four pins 19 which project below the top 16 of the cover and cooperate with the coupling 20 to guide the hinged pivoting described above and also prevent the covers moving out of their plane at the surface on which the power strip is to set and prevents interruption of proper articulation.

FIGS. 2, 6, 7, 10, and 11 show a regular coupling 20 between two of the covers 13 and FIGS. 2, 8, 9 and 11 show a special cable diversion coupling 21 between two of the covers 13. The couplings 20 and 21 are shown from above in FIGS. 6, 8 and 10 and from below in FIGS. 2, 7, 9 and 11. Each coupling has a top surface 22 which opposes the underside of the top 16 of a cover 13 over the coupling, so that they fit together and so that the couplings 20,21 stay in proper locations under the covers 13. The coupling has chamfered or generally rounded corners 24 shaped to cooperate with the lengths of the stiffening fins 18 below the cover so that the couplings can swivel as the covers pivot. The coupling has a longitudinal passageway or channel 26 at its underside which aligns with the channels 17 under adjacent covers 13 to provide a continuous pathway channel for cables. The flanges 28 at the underside of the channel 26 under the coupling helps retain cables in the channel 26 where they pass under the coupling.

In FIGS. 6-9 and 11, the coupling has preferably arcuate slots 32 in its top side 22 at corner regions near ends of the coupling. The slots receive pins 19 from under the top 16 of the cover 13. These pin and arcuate slot connections permit and guide swiveling of the covers 12 with respect to the connecting couplings 20 and 21 and guide the couplings so that the continuous channel 17, 26 beneath the covers and the couplings is maintained. This connection between covers 13 and couplings 20,21 also avoids the covers moving out of their plane or separation of the covers from each other as they are manipulated, articulate, etc.

Referring to FIGS. 1, 2, 8, 9 and 11, the special diversion couplings 21 have, at one lateral side and preferably at both lateral sides of the passage 26 through the coupling 21, a lateral, cable diversion tunnel 40, which communicates with the channels 17, 26 and permits a cable running through the channels 17, 26 to be turned laterally to be diverted out of a coupling channel into the tunnel 40 and to continue out from the tunnel, as in FIG. 1. The diverted cable also extends between the opposing edges 29 of respective adjacent segment covers 13 adjacent the tunnel 40, as seen in FIG. 1. A tunnel 40 may be provided in fewer than all of the covers 21, as shown in FIGS. 2 and 11, and the chamfered shape of the end edges 24 of the covers prevents the tunnels 40 from being blocked by adjacent covers 13 of a bent power strip.

Figure 7:
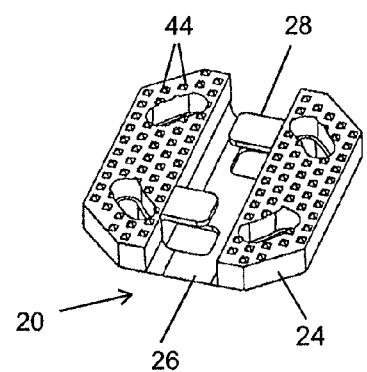
FIG. 7 is a bottom, side and perspective view of a coupling.
Figure 8:
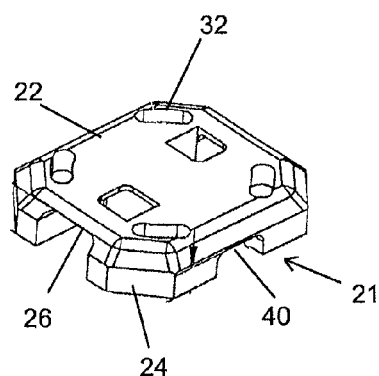
FIG. 8 is a top, side and perspective view of another kind of coupling.
Figure 9:
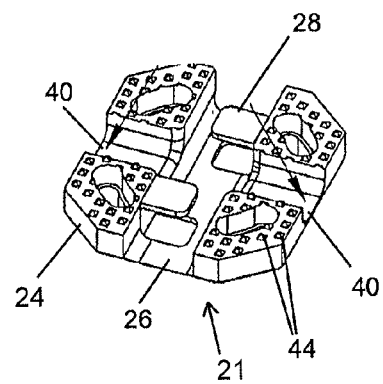
FIG. 9 is a bottom perspective view of the other kind of coupling.

Referring to FIGS. 7, 9 and 11, the undersides of the covers 20, 21 are provided with movement prevention elements 44, for example, here shown as pointed projections, which rest on a surface or floor on which the power strip 10 is seated in use and prevents or at least inhibits the power strip and the respective covers thereof from shifting over the surface due to normal usage of the power strip, e.g., connecting something to the cables that may be exiting the tunnel, or contact of the power strip with a person's foot or something moving over the power strip segments, etc.

FIG. 1 shows a diverted cable 46 extending out from a tunnel 40 in a side of a special coupling 21. Any appropriate fixture 48 for connection to a cable or a power cord may be selected.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An articulated power strip for guiding cables along a length of the power strip, the power strip comprising:
   a plurality of power strip segment covers assembled in a row to define a power strip comprised of a plurality of the covers;
   a pivot connection between each end of a segment cover and an adjacent end of an adjacent segment cover, so that each cover articulates and pivots with respect to the adjacent cover;
   each cover including a top side configured for defining a respective cover channel below the top side for passage of the cables under each cover;
   the covers being oriented in the power strip so that the cover channels define a continuous cover channel over the length of the power strip and through which the cables may be passed;
   a respective coupling articulatedly connected between respective adjacent ends of adjacent covers;
   each coupling having a coupling channel extending longitudinally therethrough oriented to align with the cover channels extending through the adjacent covers for the coupling channels to provide along with the adjacent cover channels a pathway channel for cables along and through the segments;
   at least one of the couplings having a tunnel communicating into the pathway channel and opening out to a side of the power strip, the tunnel being shaped and located for enabling a cable in the pathway channel to be diverted and redirected out of the pathway channel through the tunnel and to the side of the power strip.

2. The power strip of claim 1, the pivot connection further comprising a respective articulated hinge connection between adjacent segment covers of the power strip, the hinge connection comprising a projection from one end of each segment cover and a notch at an opposite end of each segment cover, and the projection from each segment cover engaging in the notch of the adjacent segment cover for defining an articulated connection.

3. The power strip of claim 1, further comprising the tunnel communicating into the coupling channel of the pathway channel.

4. The power strip of claim 1, further comprising a swivel connection between each coupling and the segment covers adjacent to each coupling for swiveling of the coupling with respect to the adjacent covers to which the coupling is connected, for guiding articulation of each cover with respect to an adjacent one of the covers.

5. The power strip of claim 4, wherein the swivel connection comprises projections from each cover down toward the respective coupling below the cover and a slot in each coupling positioned and configured to receive a respective one of the projection; and
   the projections and slots being to a lateral side of the coupling channel of the cover, whereby the projections move along the slots as the covers articulate to bend the power strip.

* * * * *